Sept. 12, 1939.　　　　R. ULLMAN　　　　2,172,599
FLUID ACTUATED RELAY APPARATUS
Filed June 1, 1936

INVENTOR.
ROY ULLMAN
BY George M. Meychamp
ATTORNEY

Patented Sept. 12, 1939

2,172,599

UNITED STATES PATENT OFFICE

2,172,599

FLUID ACTUATED RELAY APPARATUS

Roy Ullman, Roslyn, Pa., assignor to The Brown Instrument Company, Philadelphia, Pa., a corporation of Pennsylvania Application June 1, 1936, Serial No. 82,859

2 Claims. (Cl. 73—151)

The general object of the present invention is to provide improvements in measuring instruments of the type in which the instrument comprises a deflecting measuring element and some device or mechanism to be actuated in accordance with the deflections of said element, and requiring more force for its actuation than it is practically or desirably possible for the deflecting element to furnish, and the general object of the present invention, more specifically stated, is to provide an instrument of the above mentioned type with improved power means through which the measuring element may actuate said device or mechanism.

The improved power means provided in accordance with the present invention comprise a pneumatic relay device or mechanism, and an air compressor, forming a part of the instrument mechanism and located in the instrument casing, for supplying air under pressure to the pneumatic relay device or mechanism for actuation of the latter, in accordance with the deflections of the deflecting measuring element of the instrument. In the preferred practical form of the invention, the air compressor is driven by an electric motor also located within the instrument casing, and ordinarily serving some other instrument purpose involving a time action, such as the feed of a record chart or strip upon which the value of the quantity measured is recorded, or the driving of the timing element of mechanism for integrating the value of the quantity measured.

The present invention is adapted for advantageous use in instruments differing widely in their operating characteristics and in the character of the measuring functions which they perform. In general, the invention is equally well adapted for use, whether the sensitive deflecting element of the instrument deflects in response to variations in temperature, pressure, electric current, electro-motive force, or some other measuring force which is a function of some physical condition or quantity to be measured, and which is large enough to move the sensitive deflecting element, and which may or may not be large enough to thereby actuate a relay controller, but is not large enough for satisfactory actuation of some device or mechanism, which, in accordance with the present invention, is actuated by the power device or relay mechanism, and which must be actuated as a result of the deflections of the measuring element, in order that the instrument may serve its intended purpose.

The present invention is adapted for use, for example, in a self-balancing potentiometer instrument, to actuate the potentiometer rebalancing mechanism of the instrument, and in a recording instrument, to adjust the recording pen arm of the instrument, and in an integrating instrument, to adjust the element or part of the integrating mechanism which must vary in position with the value of the quantity measured, and to adjust control switches and valves in control instruments including control switches or valves requiring adjustment in accordance with the movements of a deflecting element too sensitive to effect such adjustments.

I am not the first to make or propose use of pneumatic relay provisions in a measuring instrument including a sensitive time deflecting element, to adjust parts requiring more force for their adjustment than can be directly furnished by the sensitive measuring element, but prior to my invention, so far as I am aware, no one has proposed, or contemplated the operation of such pneumatic instrument relay provisions, except with air under pressure supplied by some source of compressed air external to the instrument. By making the instrument wholly self-contained, in respect to its pneumatic features, I avoid practical difficulties inherent in prior instruments including pneumatic relay provisions, and the present invention is adapted to materially widen the extent of the practical field of use of measuring instruments including a power device or power actuated relay mechanism controlled by a sensitive deflecting element.

Aside from the readily apparent advantages of mechanical simplification and compactness obtainable by making an air compressor a part of the instrument mechanism enclosed in the instrument casing, certain special operative advantages and desirable characteristics are thereby obtained. In particular, with the compressor drawing air to be compressed from the interior of the instrument casing, to which the air after being utilized in the relay mechanism is exhausted or returned, I avoid the necessity for the use of a filter to prevent the passage of dust into the compressor and thence into the pneumatic relay provisions, as is required in many cases in which the air put under pressure is ordinary dust laden atmospheric air. Furthermore, I avoid disturbances in instrument operation due to the mixture with the air compressed, of water vapor, which may be passed into the instrument casing with externally compressed atmospheric air, and condensed in the latter. If desirable, the instrument may be provided with an electric heating device regulating atmospheric conditions within the instrument casing, and that device may well be a small electric light also serving a desirable instrument illumination purpose.

With the compressor located within the instrument casing, in accordance with the present invention, I not only avoid the mechanical complication of extending a compressed air supply pipe from an external source to the instrument, but I also avoid the pressure loss in, and time lag in air flow, through an elongated supply pipe, and thereby reduce the required pressure at which the air is supplied, and in consequence, the energy rquired for the operation of the compressor. While in some cases, and, in particular, where the instrument is used in proximity to furnaces or under other conditions, in which the surrounding atmosphere contains noxious gases or vapors, the casing of my improved instrument may be hermetically sealed. For the general purposes of the present invention, it is not necessary to make special provisions for the air tight closure of the instrument casing joints, and particularly, the joint between the casing body and the casing door usually provided to permit access to the casing interior.

The various features of novelty which characterize my invention are pointed out with particularity in the claims annexed to and forming a part of this specification, and in the accompanying drawing and descriptive matter in which I have illustrated, and described in some detail, a desirable form of embodiment of the invention.

Figure 1:
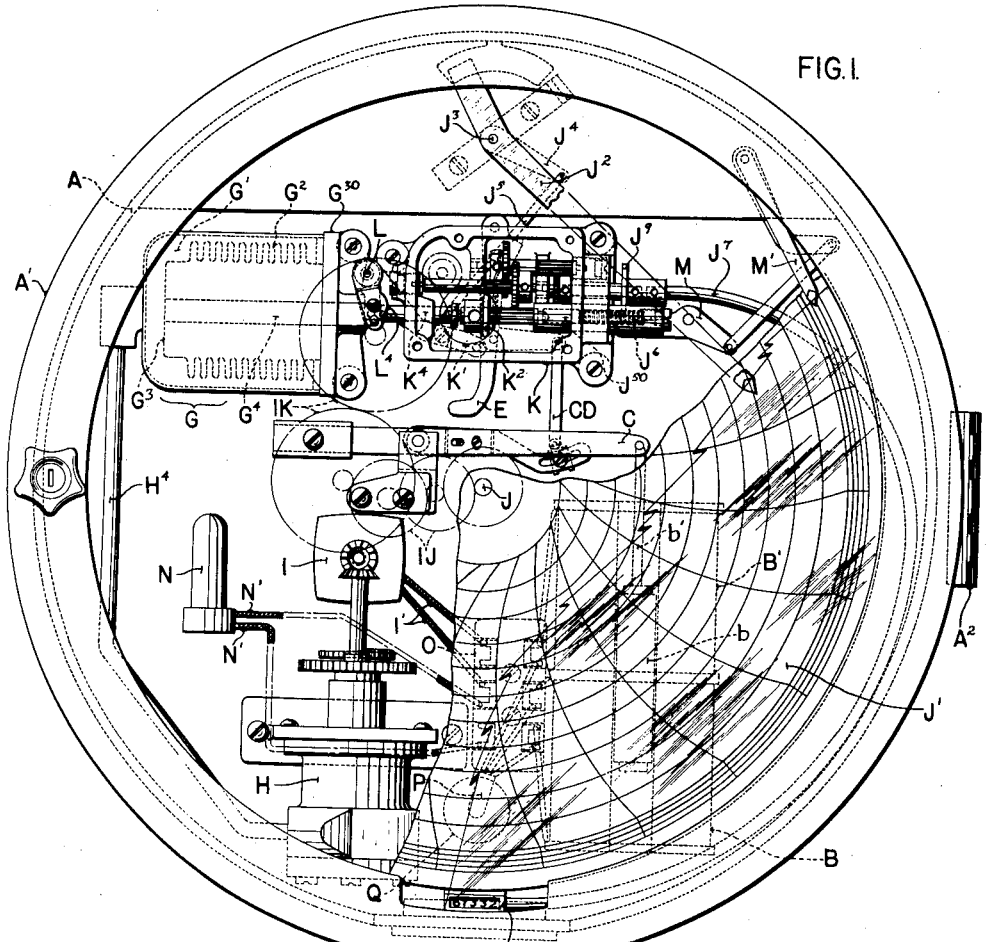
Fig. 1 is a front elevation of a flow integrating and recording instrument.
Figure 2:
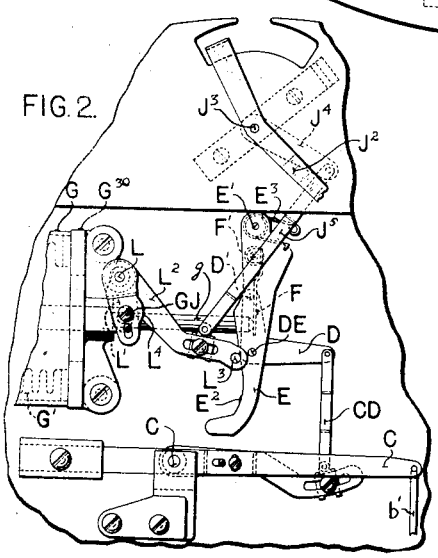
Fig. 2 is an elevation on a larger scale than Fig. 1, of parts of the instrument shown in Fig. 1.

The particular instrument shown by way of example in the drawing, is of the circular chart type, the instrument mechanism being enclosed in an instrument casing or housing, which may be in the form of a short cylinder A, provided with a front door A' connected to the casing body by a hinge $A^2$. The mechanism within the instrument includes an inductance bridge receiver element, comprising vertically disposed coils B and B', arranged end to end, and an armature $b$ axially movable in the coils B and B'. The receiving element of the instrument may be similar in type, and in its inductance bridge association with the manometer actuated transmitter element of the bridge, with the arrangement disclosed in the Harrison Patent No. 1,743,852 granted January 14, 1930, and hence need not be illustrated or described herein. The core $b$ is subjected, in many cases, to deflective forces which are so small, as to make said core a typical example of the deflecting measuring element of an instrument in which the present invention may be employed with advantage.

In the instrument shown, the core or armature $b$ is suspended from the lever C to which the upper end of a stem or link extension $b'$ from the armature $b$ is pivotally connected. The angular movements imparted to the lever C by the core $b$, are transmitted through a link CD to a lever D. The latter is pivoted on a lever E which is journalled on a supporting pivot E' carried by the instrument frame work. The angular movements of the levers D and E, effected as hereinafter described, control the adjustment of a flapper valve F which regulates the discharge of air through the discharge, or bleeder outlet, nozzle $g$ from the pressure chamber G' of a fluid pressure relay device G, and thereby regulates the pressure in the chamber G', and the operative effect of the device G, serving various instrument purposes, as hereinafter described.

Air is put under pressure, and supplied to the device G for the actuation of the latter, by an air compressor H located within the instrument casing and having its driving shaft H' gear connected to, and driven by an electric motor I also located within the instrument casing. The compressor H may be of any suitable type and form adapted for operation by an ordinary instrument motor I, and capable of supplying the relatively small volume of air at a pressure not greatly in excess of atmospheric pressure, required for the operation of the relay device G. Advantageously, the compressor is of the rotary type and as shown is of a known gear pump type having an inlet chamber $H^2$ in free communication with, and receiving air from the casing interior, and an outlet chamber $H^3$ delivering air through a delivery pipe $H^4$ to the relay device chamber G'. The inlet and outlet chambers $H^2$ and $H^3$ are connected by a cylindrical pump chamber $H^5$.

Working in the chamber $H^5$ is an impelling element $H^6$ in the general form of a spur gear smaller in diameter than, carried by, and coaxial with the pump shaft H', but eccentrically disposed with respect to the chamber $H^5$, so that the ends of its gear teeth $H^7$ will wipe or move in close proximity to the cylindrical wall of the chamber $H^5$ at one side of the latter. The teeth $H^7$ mesh with the teeth $H^9$ of a second rotating toothed element $H^8$. The latter is coaxial with the pump chamber $H^5$ and comprises a body portion larger in diameter than the chamber $H^5$, at one end of the latter. The gear teeth portions $H^9$ extend laterally from the body portion of the element $H^8$ for the full axial length of the chamber $H^5$, and the outer end of those teeth move in close contact with the cylindrical wall of said chamber. At the side of the impeller element $H^6$ at which the teeth of the latter are radially displaced from the teeth $H^8$, as a result of the eccentric relation of the elements $H^6$ and $H^8$, a stationary partition $H^{10}$ curved about the axis of the impeller $H^6$, is interposed between the ends of the teeth of the two elements. The inner surface of the partition $H^{10}$ is substantially cylindrical and coaxial with the element $H^6$, and is swept by the outer ends of the teeth $H^7$. The outer surface of the portion $H^{10}$ is substantially cylindrical and coaxial with the element $H^8$, and is swept by the inner ends of the teeth $H^9$.

Figure 3:
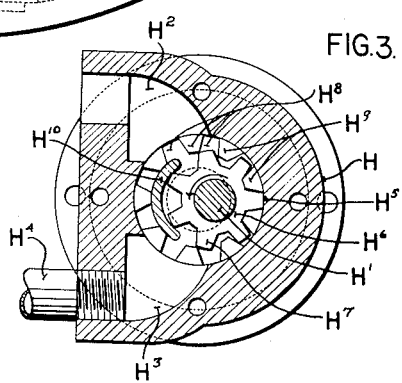
Fig. 3 is a section through the air compressor taken transversely of Fig. 1.

In operation, the element $H^6$ rotates in the direction of the arrow shown in Fig. 3, and by its toothed engagement with the element $H^8$, rotates the latter in the same direction. As will be apparent, the space between each two adjacent teeth $H^7$ is filled with air at atmospheric pressure as the teeth move through the inlet chamber $H^2$, and the air is held in said space by the partition $H^{10}$ as the ends of the two teeth sweep along said partition. Similarly, the space between each two adjacent teeth $H^8$ fills with air as the teeth move through the inlet chamber $H^2$, and that air is held in said space by the stationary partition $H^{10}$ as the ends of said teeth move along said partition. The said spaces between the adjacent teeth of each element thus carry air to the outlet chamber $H^3$, and are prevented from carrying any significant amount of air away from the outlet chamber $H^3$ as the spaces move away from that chamber, because each such space is then substantially filled by a tooth of the other pump element. Lubricating oil or other liquid is ordinarily supplied to the air compressor so as to provide liquid film seals in the joints between the relatively movable portions of the pump structure, but provisions for the purpose need not be illustrated or described, since the compressor may be, and as shown is of known type, and its specific construction forms no part of the present invention.

The motor I as shown, through suitable speed reducing gears IJ, rotates the driving element J for a chart disc $J'$, on which the value of the quantity measured by the deflections of the core $b$ is recorded by a pen arm $J^2$, which is adjusted by the device G in accordance with the deflections of the measuring element $b$. The motor I also drives, through speed reducing gear IK, the driving gear element $K'$ of an integrating mechanism K, and the latter includes a driven element $K^2$, adjusted radially of the driving element $K'$, by the device G.

As shown, the pressure chamber $G'$ of the unit or device G, to which the compressor H supplies air under pressure, and from which air is bled through the nozzle $g$, has a movable wall, formed by a bellows element $G^2$, within the cup shaped body of the unit. The element $G^2$ is connected at one end to the annular head $G^{30}$ attached to the rim of said cup shaped body. The other end of the bellows $G^2$ is closed by its movable end wall $G^3$. A rod or stem $G^4$ within, and extending longitudinally of the bellows, has one end secured to the movable bellows end wall $G^3$, and is pivotally connected at its other end by a pivot GJ to a crank arm $L'$ carried by, and turning with a crank shaft L. The latter extends transversely to the bellows axis, and is journalled on the end member $G^{30}$. Fixed to the crank shaft L is a second crank arm $L^2$ carrying a pin $L^3$ engaging an edge portion $E^2$ of the lever E.

The lever E is biased for movement in the clockwise direction, by a spring $E^3$, so that the edge $E^2$ of the lever is maintained constantly in engagement with the pin $L^3$. The flapper valve F is pivoted at $F'$, and is spring biased for movement in the clockwise direction toward the end of the nozzle $g$, so that, left to itself the flapper valve F tends to close the nozzle $g$, and thereby increase the pressure in the chamber $G'$. The flapper valve F is given movements away from the nozzle $g$, by a pin or projection $D'$ from the lever D, on clockwise movement of the latter about its pivot DE effected through the link CD and lever C by the receiver armature $b$, or as a result of counter-clockwise movements given the lever E through the pin $L^3$, by the contraction of the bellows $G^3$, produced when the pressure in the chamber $G'$ is increased.

The net operating effect of the described mechanism for adjusting the flapper valve F is to vary the pressure in the chamber $G'$, as required to make the angular position of the crank shaft L dependent in a predetermined manner on the axial adjustment position of the armature $b$, relative to the coils B and $B'$. On an increase in the fluid flow measured, which, with the arrangement shown, moves the armature $b$ to a position higher than its previous position, the direct effect of the armature movement is to give counter-clockwise adjustments to the levers C and D. The resultant counter-clockwise movement of the pin $D'$ permits a movement of the flapper valve F in the closing direction, whereby the pressure in the chamber $G'$ is increased. Each such increase of pressure gives the bellows end $G^3$ some movement to the right, which is terminated by the valve opening adjustment of the flapper valve produced by said movement, which, through the stem $G^4$, and pivot pin GJ, gives a counter-clockwise adjustment to the rock shaft L, whereby the pin $L^3$ acting on the lever E, gives a counter-clockwise adjustment to the latter. The resultant bodily movement to the right of the lever D, causes the flapper valve to move away from the nozzle $g$, as required for the maintenance of a pressure in the chamber $G'$ just sufficient to prevent further movement in either direction of the bellows end $G^3$ and stem $G^4$.

Conversely, on a decrease in the rate of flow measured, and a corresponding down movement of the armature $b$, the resultant clockwise adjustment of the lever D, moves the flapper valve F away from the nozzle $g$, and reduces the pressure in the chamber $G'$. This results in a movement of the bellows end $G^3$ and stem $G^4$ to the left. Those movements are terminated as soon as the resultant clockwise adjustments of the rock shaft L, pin $L^3$, and lever E permits a closing movement of the flapper valve F into the position required for the maintenance of the pressure in the chamber $D'$ necessary to arrest the expansion of the bellows $G^2$.

The pen arm $J^2$, which records the rate of flow on the record disc $J'$, is turned about the axis of a pivot $J^3$ by an arm $J^4$ connected by a link $J^5$ to the crank arm $L^2$.

The previously mentioned adjustable element $K^2$ of the integrating mechanism K, is a friction wheel rotating about an axis transverse to the axis of the driving element $K'$ of said mechanism, and in frictional engagement at its periphery with said driving element. The driven element $K^2$ is carried by an axially adjustable spindle journalled at one end of the plunger $K^4$ and at the other end in a plunger $J^{50}$ coaxial with said driven wheel. A spring $J^6$ acts on the plunger $J^{50}$ to hold the plunger $K^4$ in engagement with an edge $L^4$ of the crank arm $L'$. Said edge $L^4$ is suitably shaped to hold the driven member $K^2$ in engagement with the driving member $K'$ at the axis of the latter in the zero flow condition of the apparatus, and as the flow increases, to move the driven member $K^2$ radially away from said axis, so that displacement radially from said axis varies in linear proportion with the rate of flow. The integrating mechanism includes suitable speed reducing gearing through which rotative movement of the member $K^2$ gives a proportional rotative movement to a flexible shaft $J^7$. The latter operates a counting train or totalizer $J^8$ showing the integrated value of the rate of flow. The integrating mechanism also includes a cam $J^9$ acting on a lever M, which through suitable connections, give movement to a recording pen $M'$, so that the latter makes a record on the chart disc $J'$, adjacent the periphery of the latter, of the rate of increase in the integrated value of the flow.

In Fig. 1, I have somewhat diagrammatically illustrated an electric lamp N, which may serve an instrument illumination purpose or in addition to, or in lieu of the coils B and $B'$ when the latter are absent, forms a device which can be utilized to control the atmospheric temperature within the instrument housing. The lamp terminals $N'$ may be connected to the terminal board O mounted in the instrument and to which the terminals I' of the motor are also connected. The terminal board O is energized by supply conductors included in a cable P, which may enter the instrument casing through a suitable bushing or attachment part Q mounted in the rear wall of the instrument casing in a manner customary in bringing conducting leads into an instrument casing. While my invention claimed herein, comprises the combination within an instrument casing or housing, of instrument elements including a compressor, as the compressor H, a pneumatic power device or relay mechanism, as the device G, a controller, as the flapper valve F, a deflecting measuring member, as the core $b$, controlling said power device through said controller, and some element, such as the pen arm $J^2$, pen arm M', or integrating mechanism K, adjusted by the power device in accordance with the deflections of the deflecting measuring member, the present invention is not confined to, or concerned with the specific form of any of said elements, or the particular manner in which those elements are arranged for interaction. Those matters of form and arrangement did not originate with me but with Coleman B. Moore, and from the subject matter of his application, Serial No. 82,852, filed of even date herewith.

A second embodiment of the specific invention herein claimed, in a self-balancing potentiometer instrument including improvements of the said Coleman B. Moore, is fully disclosed and claimed in a second application of the latter, Serial Number 82,850, filed of even date herewith, and a third specific embodiment of the invention herein claimed in a control instrument including improvements of the said Coleman B. Moore, is disclosed and claimed in a third application of the latter, Serial No. 82,851, filed of even date herewith. The very considerable differences between the particular embodiments of the invention disclosed in the above mentioned applications of Coleman B. Moore are indicative of, and by reason of their very considerable specific differences, give some illustration of the wide range of instrument use which may advantageously be made of the invention herein claimed.

While in accordance with the provisions of the statutes, I have illustrated and described the best form of embodiment of my invention now known to be, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a measuring instrument, the combination with a substantially dust-proof instrument casing, of instrument mechanism mounted within said casing but not occupying the entire space within said casing, said mechanism comprising an element adapted to deflect in accordance with changes in a quantity measured, an adjustable device, pneumatic relay means controlled by said element and adapted to adjust said device and discharge air into said space, and an air compressor adapted to receive air from said space, compress it and supply it under pressure to said relay means.

2. In a measuring instrument, the combination with a substantially dust-proof instrument casing, of instrument mechanism mounted within said casing but not occupying the entire space within said casing, said mechanism comprising an element adapted to deflect in accordance with changes in a quantity measure, an adjustable device, pneumatic relay means controlled by said element and adapted to adjust said device and to discharge air into said space, an air compressor adapted to receive air from said space, compress it and supply it under pressure to said relay means, a member having timed movements and thereby serving a measuring purpose of the instrument, and an electric motor driving said compressor and giving the last mentioned member its timed movements.

ROY ULLMAN.